(12) United States Patent
Du et al.

(10) Patent No.: US 9,371,433 B2
(45) Date of Patent: Jun. 21, 2016

(54) ADDITIVE FOR ENHANCING TOUGHNESS OF MARBLE ADHESIVE

(71) Applicant: WUHAN KEDA MARBLE PROTECTIVE MATERIALS CO., LTD., Wuhan (CN)

(72) Inventors: Kunwen Du, Wuhan (CN); Kunwu Du, Wuhan (CN)

(73) Assignee: WUHAN KEDA MARBLE PROTECTIVE MATERIALS CO., LTD., Wuhan (CN)

( * ) Notice: Subject to any disclaimer, the term of this patent is extended or adjusted under 35 U.S.C. 154(b) by 0 days.

(21) Appl. No.: 13/975,393

(22) Filed: Aug. 26, 2013

(65) Prior Publication Data

US 2013/0338285 A1 Dec. 19, 2013

Related U.S. Application Data

(63) Continuation-in-part of application No. PCT/CN2012/071045, filed on Feb. 13, 2012.

(30) Foreign Application Priority Data

Feb. 24, 2011 (CN) .......................... 2011 1 0043873

(51) Int. Cl.
*C08K 5/06* (2006.01)
*C08K 5/05* (2006.01)

(52) U.S. Cl.
CPC .... *C08K 5/06* (2013.01); *C08K 5/05* (2013.01)

(58) Field of Classification Search
USPC .................................................. 524/376, 384
See application file for complete search history.

(56) References Cited

U.S. PATENT DOCUMENTS

| 5,460,632 A * | 10/1995 | Ruggiero ................. C09D 7/06 510/424 |
| 5,470,930 A * | 11/1995 | Toba et al. ..................... 526/204 |
| 2002/0086140 A1 * | 7/2002 | Ghahary ....................... 428/143 |
| 2003/0059599 A1 * | 3/2003 | Beckley ...................... C08F 2/16 428/327 |
| 2004/0024144 A1 * | 2/2004 | Solomon et al. ................. 526/72 |

* cited by examiner

*Primary Examiner* — Peter D Mulcahy
*Assistant Examiner* — Henry Hu
(74) *Attorney, Agent, or Firm* — Matthias Scholl, PC; Matthias Scholl

(57) ABSTRACT

An additive for a marble adhesive is disclosed. The additive is selected from the group consisting of R—($C_6H_4$)—$CH_2OH$, R—O—($CH_2$)$_2$—O—($CH_2$)$_2$—OH, R—O—$CH_2$—CH(OH)—$CH_3$, R—O—($CH_2$)$_2$—OH, and a mixture thereof, where R represents hydrogen or alkyl.

7 Claims, No Drawings

ADDITIVE FOR ENHANCING TOUGHNESS OF MARBLE ADHESIVE

CROSS-REFERENCE TO RELATED APPLICATIONS

This application is a continuation-in-part of International Patent Application No. PCT/CN2012/071045 with an international filing date of Feb. 13, 2012, designating the United States, now pending, and further claims priority benefits to Chinese Patent Application No. 201110043873.7 filed Feb. 24, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

This invention relates to an additive or composition of marble adhesives, and more particularly to an additive capable of enhancing the toughness of marble adhesives.

2. Description of the Related Art

The bonding strength of an adhesive is jointly codetermined by the cohesive strength and adhesion strength of colloid. If the rigidity of the colloid is too strong, the interface for the bonding surface of the adhesive will be damaged; and if the toughness of the adhesive is too great, the cohesion for the bonding surface of the adhesive will be damaged. Therefore, the bonding strength of the adhesive will reach the optimum value only when the rigidity of the colloid is moderate. However, the rigidity of existing marble adhesives is relatively strong, and the bonding surface is easy to release after a long time, thereby damaging the interface and affecting the bonding effect.

At present, the craze of different degrees, appearing in the condensate of marble adhesives, is common. The craze is very similar to the crack, and the difference is that the middle of the crack is hollow, while the middle cavity of the craze is connected by the craze material. The crack grows thickened and forms into the crack by fracturing the craze material. Due to the appearance and development of the craze, the mechanical properties of the material worsen rapidly. In addition, the "ice" phenomenon resulting from the volatilization and auto-agglutination of styrene (cross-linking agent and diluent) in the marble adhesives is common, thereby affecting the operation and use.

Therefore, to develop an additive, which is capable of enhancing the toughness of marble adhesives, and maintaining the moderate strength of marble adhesive and overcoming the "ice" phenomenon and craze of marble adhesives, has become an urgent and important work.

SUMMARY OF THE INVENTION

In view of the above-described problems, a special adhesive is added to a marble adhesive, so as to improve the toughness of the conventional marble adhesive, restrain the formation of the craze, and maintain the good mechanical properties and strong bonding strength. Meanwhile, the adhesive avoids the "ice" phenomenon of the conventional marble adhesives, and reduces the cost of the marble adhesives.

To achieve the above objective, in accordance with one embodiment of the invention, there is provided an additive capable of enhancing the roughness of a marble adhesive, the additive being selected from the group consisting of R—($C_6H_4$)—$CH_3OH$, R—O—$(CH_2)_2$—O—$(CH_2)_2$—OH, R—O—$CH_2$—CH(OH)—$CH_3$, R—O—$(CH_2)_2$—OH, or a mixture thereof, wherein, R represents hydrogen or an alkane, and a dosage of the additive accounts for between 0.5 wt. % and 10 wt. % of unsaturated polyester resins of the marble adhesive.

In a class of this embodiment, the additive is benzyl alcohol, diethylene glycol methyl ether, diethylene glycol monoethyl ether, propylene glycol monomethyl ether, ethylene glycol monomethyl ether, or a mixture thereof.

In a class of this embodiment, the dosage of the additive accounts for between 1 wt. % and 5 wt. % of unsaturated polyester resins of the marble adhesive.

In a class of this embodiment, the dosage of the additive accounts for between 5 wt. % and 10 wt. % of unsaturated polyester resins of the marble adhesive.

In a class of this embodiment, the dosage of the additive accounts for 8 wt. % of unsaturated polyester resins of the marble adhesive.

In another aspect, the invention provides a method for enhancing the toughness of a marble adhesive comprising unsaturated polyester resins, the method comprising adding the additive to the marble adhesive, and a dosage of the additive accounts for between 0.5 wt. % and 10 wt. % of the unsaturated polyester resins of the marble adhesive.

The adhesive has the following advantages: 1. enhance the roughness of marble adhesive, improve the adhesion property of the bonding surface, and enhance the bonding strength of marble adhesive; 2. restrain the production of the craze, and improve the mechanical properties of marble adhesive; 3. reduce the viscosity of the colloid, optimize the harmonicity of the colloid, and improve the infiltration permeability of the colloid to the stone; 4. substitute a part of styrene, thereby restraining the volatilization of styrene (styrene, used as the reactive diluent by the current marble adhesive mostly, has strong volatility), and improve the "ice" phenomenon of the marble adhesive; 5. no pungent smell; and 6. reduce the production cost of the marble adhesive.

DETAILED DESCRIPTION OF THE EMBODIMENTS

For further illustrating the invention, experiments detailing an additive capable of enhancing the roughness of a marble adhesive are described below. It should be noted that the following examples are intended to describe and not to limit the invention.

The invention provides an additive capable of enhancing the roughness of a marble adhesive. The additive is selected from the group consisting of R—($C_6H_4$)—$CH_3OH$, R—O—$(CH_2)_2$—O—$(CH_2)_2$—OH, R—O—$CH_2$—CH(OH)—$CH_3$, R—O—$(CH_2)_2$—OH, or a mixture thereof, in which R represents hydrogen or an alkane, and a dosage of the additive accounts for between 0.5 wt. % and 10 wt. % of unsaturated polyester resins of the marble adhesive.

The additive is benzyl alcohol, diethylene glycol methyl ether, diethylene glycol monoethyl ether, propylene glycol monomethyl ether, ethylene glycol monomethyl ether, or a mixture thereof.

The dosage of the additive accounts for between 0.5 wt. % and 10 wt. % of unsaturated polyester resins of the marble adhesive.

Technical indexes of marble adhesives according to building materials industry standards JC/T989-2006, PRC. are given below:

| | Technical indexes | |
|---|---|---|
| Items | High-class products | Qualified products |
| Color, appearance, and state in a container | Products should be fine viscous paste with uniform color, without obvious isolation and gel as well as rough particles, easy to stir, and color or package of products should be clearly distinguishable. | |
| Rebound deflection (MPa) ≥ | 2000 | 1500 |
| Impact flexibility (KJ/m$^2$) ≥ | 3.0 | 2.0 |
| Pressure-shear Stone-stone strength (MPa) ≥ Standard conditions | 8.0 | 7.0 |

Example 1 (Comparative Example)

(100 Parts of Unsaturated Polyester Resin by Weight, Similarly Hereinafter)

Properties of a transparent marble adhesive in the prior art are measured as follows: the compression shear strength is 14.6 MPa, the tensile shear strength is 16.2 MPa, the bending modulus of elasticity is 5201.4 MPa, and the impact toughness is 2.62 KJ/m2.

Example 2

0.5 part by weight of benzyl alcohol as an adhesive is added to a marble adhesive. By measurement, the properties of the marble adhesive are as follows: the compression shear strength is 15.1 MPa, the tensile shear strength is 16.4 MPa, the bending modulus of elasticity is 5072.6 MPa, and the impact toughness is 2.73 KJ/m2.

If the benzyl alcohol is replaced by one material of the group consisting of diethylene glycol methyl ether, diethylene glycol monoethyl ether, propylene glycol monomethyl ether, or ethylene glycol monomethyl ether, the effect is basically the same.

Example 3

1 part by weight of benzyl alcohol as an adhesive is added to a marble adhesive. By measurement, the properties of the marble adhesive are as follows: the compression shear strength is 18.9 MPa, the tensile shear strength is 17.5 MPa, the bending modulus of elasticity is 4016.8 MPa, and the impact toughness is 2.97 KJ/m2.

Example 4

5 parts by weight of benzyl alcohol as an adhesive are added to a marble adhesive. By measurement, the properties of the marble adhesive are as follows: the compression shear strength is 17.3 MPa, the tensile shear strength is 16.9 MPa, the bending modulus of elasticity is 3740.5 MPa, and the impact toughness is 3.34 KJ/m2.

Example 5

A mixture of 4 parts by weight of benzyl alcohol and 4 parts by weight of diethylene glycol methyl ether as an adhesive is added to a marble adhesive. By measurement, the properties of the marble adhesive are as follows: the compression shear strength is 16.7 MPa, the tensile shear strength is 16.5 MPa, the bending modulus of elasticity is 3510.7 MPa, and the impact toughness is 3.58 KJ/m2.

Example 6

A mixture of 3 parts by weight of benzyl alcohol, 3 parts by weight of diethylene glycol methyl ether, and 3 parts by weight of diethylene glycol monoethyl ether as an adhesive is added to a marble adhesive. By measurement, the properties of the marble adhesive are as follows: the compression shear strength is 15.2 MPa, the tensile shear strength is 15.0 MPa, the bending modulus of elasticity is 3341.9 MPa, and the impact toughness is 3.67 KJ/m2.

Example 7

A mixture of 2 parts by weight of benzyl alcohol, 3 parts by weight of diethylene glycol methyl ether, 2 parts by weight of diethylene glycol monoethyl ether, and 3 parts by weight of propylene glycol monomethyl ether as an adhesive is added to a marble adhesive. By measurement, the properties of the marble adhesive are as follows: the compression shear strength is 13.1 MPa, the tensile shear strength is 13.4 MPa, the bending modulus of elasticity is 3012.4 MPa, and the impact toughness is 3.73 KJ/m2.

Example 8

A mixture of 3 parts by weight of benzyl alcohol, 3 parts by weight of diethylene glycol methyl ether, 3 parts by weight of diethylene glycol monoethyl ether, 3 parts by weight of propylene glycol monomethyl ether, and 3 parts by weight of ethylene glycol monomethyl ether as an adhesive is added to a marble adhesive. By measurement, the properties of the marble adhesive are as follows: the compression shear strength is 9.8 MPa, the tensile shear strength is 10.1 MPa, the bending modulus of elasticity is 2321.0 MPa, and the impact toughness is 4.01 KJ/m2.

The marble adhesives employed in Examples 1-8 are transparent, while the following examples 9-12 employ colored marble adhesives.

Example 9 (Comparative Example)

Properties of a colored marble adhesive in the prior art are measured as follows: the compression shear strength is 11.1 MPa, the tensile shear strength is 14.4 MPa, the bending modulus of elasticity is 5974.8 MPa, and the impact toughness is 1.93 KJ/m2.

Example 10

1 part by weight of propylene glycol monomethyl ether as an adhesive is added to a marble adhesive. By measurement, the properties of the marble adhesive are as follows: the compression shear strength is 13.8 MPa, the tensile shear strength is 15.9 MPa, the bending modulus of elasticity is 5134.7 MPa, and the impact toughness is 2.34 KJ/m2.

Example 11

A mixture of 2 parts by weight of diethylene glycol methyl ether, 2 parts by weight of diethylene glycol monoethyl ether, and 2 parts by weight of propylene glycol monomethyl ether as an adhesive is added to a marble adhesive. By measurement, the properties of the marble adhesive are as follows: the compression shear strength is 15.3 MPa, the tensile shear strength is 16.9 MPa, the bending modulus of elasticity is 4324.1 MPa, and the impact toughness is 2.98 KJ/m2.

Example 12

A mixture of 4 parts by weight of diethylene glycol methyl ether, 2 parts by weight of diethylene glycol monoethyl ether, 3 parts by weight of propylene glycol monomethyl ether, and 4 parts by weight of ethylene glycol monomethyl ether as an adhesive is added to a marble adhesive. By measurement, the properties of the marble adhesive are as follows: the compression shear strength is 9.2 MPa, the tensile shear strength is 9.4 MPa, the bending modulus of elasticity is 3216.5 MPa, and the impact toughness is 3.43 KJ/m2.

After the trial, the additive of the invention has a toughening effect on the transparent marble adhesive and colored marble adhesive.

Conclusion: From the examples, it can be seen that: 1) the impact toughness of the marble adhesive without the additive is relatively small, and the toughness of the marble adhesive increases gradually with the continuous addition of the additive; but the other mechanical properties decrease to some extent if the amount of the additive added is too large. It is not difficult to see that the comprehensive properties of the marble adhesive in example 5 are the best.

2) The toughness of the marble adhesive increases gradually after adding the additive, and the possible reason is that the addition of the additive prevents the formation and diffusion of the craze.

3) After testing in an oven at 50° C. and placing for 3 months, the adhesives in Examples 1 and 9 have the appearance of "ice" phenomenon, and the other examples do not have this phenomenon. Thus, it can be seen that the addition of the additive slows down the formation of "ice" of the marble adhesive.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for enhancing the toughness of a marble adhesive comprising unsaturated polyester resins, the method comprising adding an additive to the marble adhesive, wherein:
   the additive is selected from the group consisting of benzyl alcohol, diethylene glycol methyl ether diethylene glycol monoethyl ether, propylene glycol monomethyyl ether, ethylene glycol monomethyl ether, and a mixture thereof; and
   an amount of the additive accounts for between 0.5 wt. % and 10 wt. % of the unsaturated polyester resins of the marble adhesive.

2. The method of claim 1, wherein the amount of the additive accounts for between 1 wt. % and 5 wt. % of unsaturated polyester resins of the marble adhesive.

3. The method of claim 1, wherein the amount of the additive accounts for between 5 wt. % and 10 wt. % of unsaturated polyester resins of the marble adhesive.

4. The method of claim 3, wherein the amount of the additive accounts for 8 wt. % of unsaturated polyester resins of the marble adhesive.

5. The method of claim 1, wherein the additive enhances the toughness of the marble adhesive.

6. The method of claim 1, wherein after the additive is added, an impact toughness of the marble adhesive is increased by between 0.11 and 1.39 kJ/m$^2$ with respect to that of a marble adhesive without the additive.

7. The method of claim 1, wherein after the additive is added, an impact toughness of the marble adhesive is increased by between 0.41 and 1.50 kJ/m$^2$ with respect to that of a marble adhesive without the additive.

* * * * *